United States Patent [19]

Vesely

[11] 4,119,544
[45] Oct. 10, 1978

[54] SETTLING CONTAINER

[75] Inventor: Ernst Vesely, Sussex, N.J.

[73] Assignee: The Purdue Frederick Company, South Norwalk, N.Y.

[21] Appl. No.: 791,152

[22] Filed: Apr. 26, 1977

[51] Int. Cl.$^2$ ............................................. B01D 21/00
[52] U.S. Cl. ................................... 210/515; 128/2 F; 215/11 C; 215/DIG. 3; 210/518; 210/521; 422/101
[58] Field of Search ............................... 210/513–515, 210/521, 522, 532, 518, DIG. 24; 128/2 F; 215/1 R, 1 C, 11 R, 11 C, 227, 231, DIG. 3; 264/94, 97, 98; 23/259, 292

[56] References Cited

U.S. PATENT DOCUMENTS

| | | | |
|---|---|---|---|
| 2,779,472 | 1/1957 | Febbraro | 210/514 |
| 3,184,524 | 5/1965 | Whiteford | 264/94 |
| 3,881,465 | 5/1975 | Raitto | 128/2 F |
| 4,040,791 | 8/1977 | Kuntz | 128/2 F |

FOREIGN PATENT DOCUMENTS 23,388  8/1910  United Kingdom ................... 215/1 R Primary Examiner—Frank Sever
Attorney, Agent, or Firm—Steinberg & Blake

[57] ABSTRACT

A device which is adapted to receive a liquid having particles suspended therein includes a one-piece plastic container having an open top, a closed bottom, and an endless side wall extending between the open top and closed bottom to define with the bottom of the container a hollow interior thereof. A partition structure which is integral with the side wall of the container is situated between the open top and closed bottom thereof to define in the interior of the container upper and lower chambers separated from each other by the partition structure. This partition structure extends across the interior of the container and has therein a free edge defining with an inner surface of the side wall of the container an opening through which the above chambers communicate with each other. When a liquid having particles suspended therein is introduced into the container to an elevation higher than the partition structure, the particles will settle into the lower chamber while a clear liquid substantially free of these particles remains in the upper chamber and can be poured out of the container from the upper chamber thereof substantially free of the particles which settle in the lower chamber.

9 Claims, 7 Drawing Figures

SETTLING CONTAINER

BACKGROUND OF THE INVENTION

The present invention relates to settling containers.

Thus, the present invention relates to containers which are designed to receive a liquid having particles suspended therein. Once such a liquid is introduced into the container, it is possible for particles suspended in the liquid to settle into the lower region of the container while a substantially clear liquid remains at the upper part of the container.

Containers of this type may be used, for example, in connection with urine samples. Thus, urine conventionally contains particles suspended therein. Generally, when the urine is tested, one test should be carried out with the clear urine, free of the particles suspended therein, while if desired additional testing can be carried out in connection with the part of the urine which contains the particles suspended therein. It is, therefore, necessary to provide a container capable of separating the clear liquid from which the particles have settled from the liquid which contains the settled particles.

Containers for this general purpose are known. Thus, conventional containers of this type have in their interior a transverse partition situated above the bottom of the container and formed with an opening so that the particles can settle into the liquid below the partition while above the partition there remains a clear liquid which can be for the most part poured off separately from the lower part of the liquid which contains the settled particles, and thereafter, the lower part of the liquid with the settled particles can also be poured out of the container.

In connection with prior art pertaining to containers of the above general type, reference may be made to U.S. Pat. No. 926,805 which shows a shaving cup for separating liquid from soap, U.S. Pat. No. 2,399,665, relating to a cream separator, and U.S. Pat. No. 2,779,472 which shows various types of containers having sediment traps and designed particularly for use with alcoholic beverages.

While containers are known to serve functions as set forth above, these known containers are costly to manufacture because of their complex configurations. For example, conventional containers of the above type may have a false bottom which forms a partition as set forth above, but this false bottom complicates the structure of the conventional containers and often is required to be a separate element which is introduced into and joined to the remainder of the container. Moreover, with such conventional containers air can easily become trapped in the lower chamber beneath the partition, and such trapped air often is undesirable.

SUMMARY OF THE INVENTION

It is accordingly a primary object of the present invention to provide a container which is of the above general type while having a simple, inexpensive construction.

In particular, it is an object of the present invention to provide a container of the above general type which is of a simple one-piece construction.

Also it is an object of the present invention to provide a container of this type which will avoid the possibility of air being trapped in the lower chamber.

According to the invention the container has an open top and a closed bottom, as well as an endless side wall extending between the open top and bottom, this side wall defining with the closed bottom of the container a hollow interior thereof which is adapted to receive a liquid having particles suspended therein. A partition means is integral with the side wall and extends across the hollow interior of the container while being spaced from the open top and closed bottom thereof to define in the hollow interior of the container upper and lower chambers separated from each other by the partition means. This partition means has in the hollow interior of the container a free edge which is spaced from an inner side surface of the side wall and defines therewith an opening through which the chambers communicate with each other. Thus particles suspended in a liquid introduced into the container to an elevation substantially higher than the partition means will settle into the lower chamber to enable at least part of the liquid in the upper chamber to be poured out of the container in a condition substantially free of any suspended particles. Thereafter, if desired, the liquid in the lower chamber with the particles which have settled therein can also be poured out of the container.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
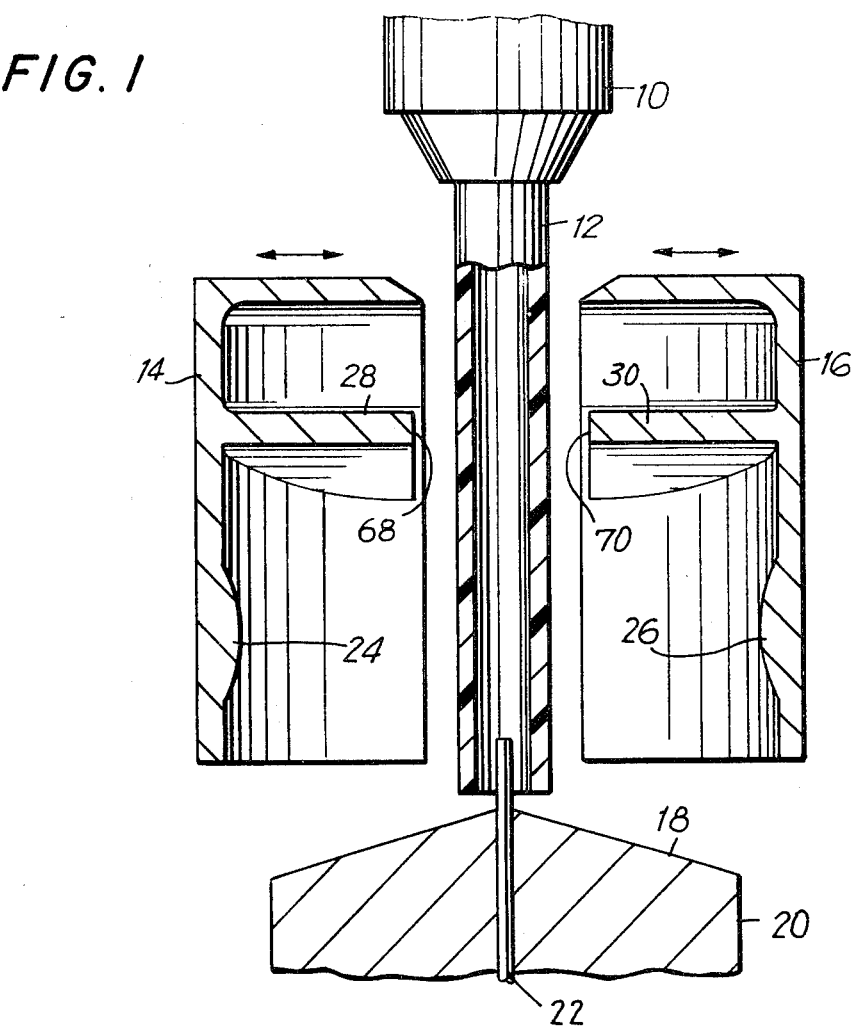
FIG. 1 is a schematic illustration of the method of manufacturing a container according to the invention.

A container according to the invention is illustrated in FIGS. 2-7, while FIG. 1 schematically illustrates the method of manufacturing this container. Thus, referring to FIG. 1, it will be seen that from an extruder head 10 a tube or parison 12 of thermoplastic material is provided so as to be in a workable form. The tube or parison 12 is situated between a pair of mold halves or dies 14 and 16 which are shown in FIG. 1 in a position separated from each other so that the parison 12 can be received therebetween. The bottom open end of the parison 12 is adapted to be engaged by the upper tapered or conical surface 18 of a mandrel 20 which can be raised and lowered by way of an unillustrated mechanism, this mandrel 20 being formed with an axial bore through which a tube 22 passes. This tube 22 has an upper open end through which air or another suitable gas can be introduced into the interior of the parison 12 so as to expand the latter. Thus, the surface 18 will be raised to engage the bottom end of the parison 12 to close off the interior thereof into which the air or other gas is introduced from the tube 22, and through an unillustrated mechanism the dies 14 and 16 are brought together so as to cut off a portion of the parison 12. This portion remains in the interior of the dies 14 and 16 to be expanded tightly against the inner surface thereof. The bottom end of the parison will also expand outwardly, and the lower edge region thereof will become pinched between the surface 18 and the bottom peripheral edges of the dies 14 and 16 to form in this way the open top of a container. The bottom thereof will closed and will be formed by the joined top walls of the dies 14 and 16.

The inner surfaces of the dies 14 and 16 are formed with a pair of opposed bulging projections 24 and 26, respectively, so that by way of these projections the blowmolded container will have at its exterior a pair of opposed indentations for receiving fingers of a user of the container to facilitate grasping thereof. In addition the dies 14 and 16 have in their interior transverse walls 28 and 30, respectively, which provide the container with a partition means as described below as well as with an exterior vertical rib as also described in greater detail below.

The techniques used in the blow-molding of the container of the invention may conform to those shown in U.S. Pat. No. 3,371,376, although the expanding claws of the latter patent need not be utilized. Also, in connection with the techniques shown in U.S. Pat. No. 3,371,376 it is also possible to use techniques as illustrated in U.S. Pat. Nos. 3,499,071 and 3,412,187, if desired. Thus the features of the latter patents may be used instead of or in combination with the features of U.S. Pat. No. 3,371,376 in order to blow-mold the container of the invention.

It is to be noted that the transverse walls 28 and 30 do not extend completely across the interiors of the dies but instead terminate in free edges while the tube 22 does not move up to an elevation higher than the walls 28 and 30, so that there remains in the interior of the joined dies 14 and 16, and thus in the interior of the expanding parison 12, a space through which the gas under pressure can act to expand the parison 12 in the space above the walls 28 and 30 as well as below the walls 28 and 30, as viewed in FIG. 1.

The parison 12 is of course made of any suitable thermoplastic material such as polyethylene, polypropylene, polyvinylchloride, polyvinylacetate, polystyrene, etc.

Referring now to FIGS. 2–7, the container manufactured by way of the above method is illustrated therein. Thus is will be seen that the container 32 has an open top 34 as well as a closed bottom 36 and an endless side wall 38 extending between the open top 34 and the closed bottom 36. Thus the endless side wall 38 and the bottom 36 define the hollow interior 40 of the container 32 of the invention.

Figure 2:
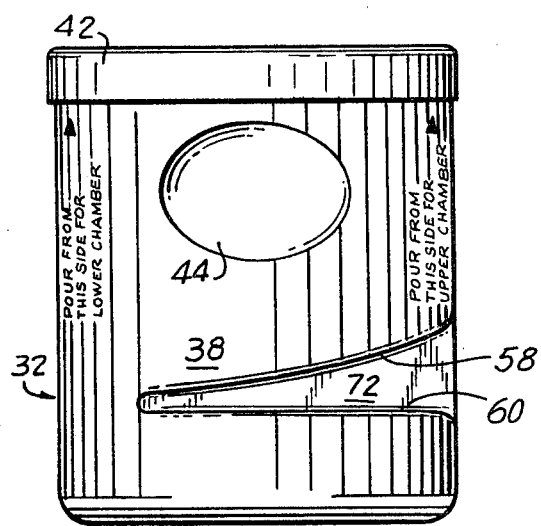
FIG. 2 is a side elevation of a container according to the invention, the container being shown in FIG. 2 with a closure cap which can be removed.
Figure 3:
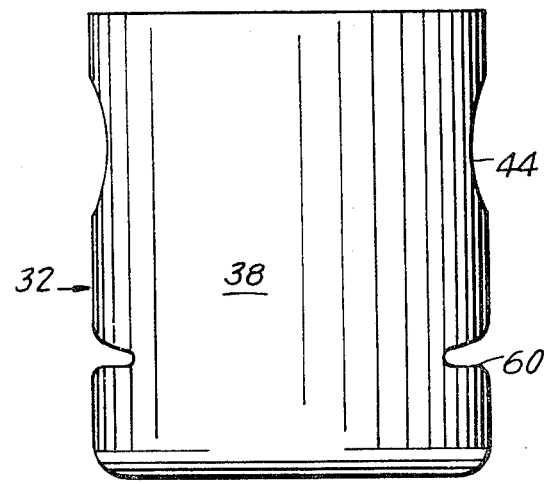
FIG. 3 shows the container of FIG. 2 as it appears from the left of FIG. 2, with the closure cap removed.
Figure 4:
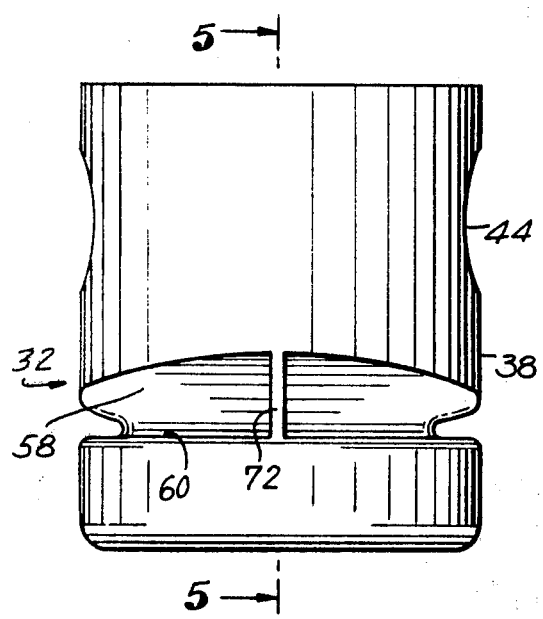
FIG. 4 shows the container of FIG. 2 as it appears from the right of FIG. 2, also with the closure cap removed.

As is indicated in FIG. 2, the container 32 may be provided with a closure member 42 in the form of a suitable cap which may be seated on the top open end of the container so as to be removable therefrom in any convenient manner while closing off the interior of the container when the closure cap or member 42 is seated on the container in the manner shown in FIG. 2. This closure cap 42 is not illustrated in FIGS. 3–7.

The one-piece plastic container 32 of the invention will of course have at opposed portions of the endless side wall 38 indentations 44 to facilitate grasping of the container.

According to a particular feature of the invention, the walls 28 and 30 of the dies 14 and 16 provide the container of the invention with a partition means 46 which is integral with the endless side wall 38 and which extends across the hollow interior 40 of the container. Thus, the partition means 46 will provide the hollow interior 40 of the container with an upper chamber 48 situated above the partition means 46 and a lower chamber 50 situated below the partition means 46.

Because the walls 28 and 30 do not extend completely across the interiors of the dies 14 and 16, these walls provide the partition means 46 with a free edge 52 which with an inner surface region 54 of the side wall 38 defines an opening 56 through which the chambers 48 and 50 communicate with each other. The configuration of the walls 28 and 30 is such that the free edge 52 is a straight edge providing the opening 56 with the configuration clearly apparent from FIGS. 6 and 7.

Figure 5:
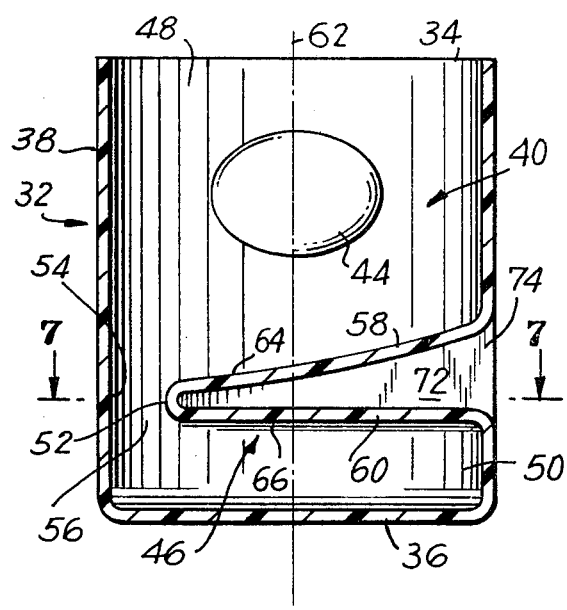
FIG. 5 is a sectional elevation of the container, taken along line 5—5 of FIG. 4 in the direction of the arrows.
Figure 6:
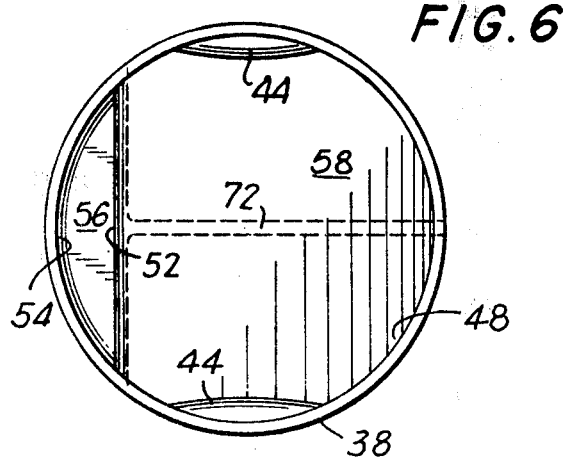
FIG. 6 is a top plan view of the container of FIG. 5.
Figure 7:
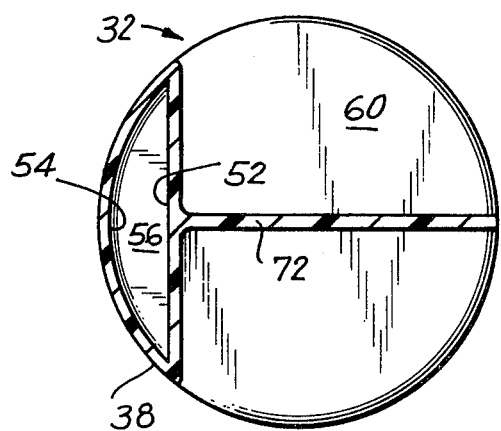
FIG. 7 is a horizontal section of the container of FIG. 5 taken along line 7—7 of FIG. 5 in the direction of the arrows.

Moreover, the construction of the walls 28 and 30 is such that the partition means 46 has an upper wall 58 which is inclined in the manner most clearly apparent from FIG. 5 as well as a lower wall 60 which is parallel to the bottom wall 36. The wall 36 as well as the wall 60 are normal to a central axis 62 which is surrounded by the side wall 38. It will be noted particularly from FIG. 6 that the partition means extends through more than 180° around the axis 62 while still leaving the partition means with the free edge 52. Thus, the upper wall 58 will provide the partition means with an upper surface 64 which is inclined as illustrated in FIG. 5 so that the lowest elevation of this upper surface 64 is situated at the free edge 52, with the portion of surface 64 which is of the highest elevation being situated most distant from the edge 52. The wall 60 of course provides the partition means 46 with a lower surface 66 which faces the bottom wall 36 to define with the latter and the lower portion of the side walls 38 the lower chamber 50.

As is apparent from FIG. 1, the die walls 28 and 30 terminate respectively in free ends 68 and 70, respectively, which when the dies are closed against each other define between themselves a space in which a vertical rib 72 is formed from the parison 12. As is apparent from the drawings, this vertical rib or wall 72 is situated at the exterior of the container between the walls 58 and 60 and has a substantially triangular configuration. Thus the vertical wall 72 is situated in a plane which contains the axis 62 and terminates in an outer edge 74 which forms a continuation of the exterior surface of the endless side wall 38. Moreover, as is apparent from FIG. 6, the vertical wall 72 is situated in a plane which bisects the walls 58 and 60.

When a liquid having particles suspended therein, such as urine, is poured into the container 32 of the invention to an elevation substantially higher than the partition means 46, this liquid can remain in the container for a time sufficient for the particles to settle in the liquid. These particles will of course settle down through the opening 56 into the liquid contained in the lower chamber 50 beneath the partition means 46. The inclination of the upper surface 64 of the wall 58 of the partition means will of course contribute to the movement of the particles downwardly to the lower chamber 50. Moreover, because the surface 60 is parallel to the wall 36, no air can be trapped in the liquid of the lower chamber 50 next to the lower surface 60.

After the liquid has remained in the container for an interval sufficient for the particles to settle into the lower chamber 50, the clear liquid substantially free of particles can for the most part be poured out of the container by tilting the latter in a clockwise direction, as viewed in FIG. 5. In this way, in the case of a urine sample, for example, it is possible to derive from the container of the invention urine which is free of particles initially suspended therein.

If it is desired also to test the liquid in the lower chamber 50 with the settled particles therein, then after the clarified liquid has been poured out in the above manner to the desired extent, the container is tilted in a counterclockwise direction, as viewed in FIG. 5, so that now the liquid in the chamber 50 with the particles suspended therein can be poured out through the opening 56 and over the upper left edge region of the container, as viewed in FIG. 5.

Thus, it will be seen that the container of the invention is inexpensive inasmuch as it is easily manufactured in a single blow-molding operation from any suitable thermoplastic material. It thus becomes unnecessary first to manufacture a container such as a suitable cup without any partition therein and thereafter to join the partition to the container. The container of the invention although of a relatively complex configuration nevertheless is in the form of a one-piece plastic member which is relatively simple to clean and maintain and which has a long useful life. Of course the identations 44 facilitate use of the container which can be provided with the closure member 42 as described above.

It is particularly to be noted that the vertical wall 72 which is integral with the upper and lower walls 58 and 60 of the partition means gives the container of the invention a considerable strength, since by way of this wall 72 the walls 58 and 60 are maintained fixed with respect to each other. Thus, by way of this wall 72 any movement of the walls 58 and 60 toward and away from each other, which otherwise might occur, is prevented, thus preventing any possible cracking of the container at the region of the free edge 52 of the partition means 46.

What is claimed is:

1. A device for receiving and clarifying a liquid having particles suspended therein, comprising a receptacle consisting of a one-piece plastic container having an open top, a closed bottom, and an endless side wall extending between said open top and bottom, said side wall defining with said closed bottom of said container a hollow interior thereof adapted to receive a liquid having particles suspended therein, and said container having a central axis surrounded by said side wall, said side wall being parallel to said axis with said container having a constant cross section in any plane normal to said axis situated between said open top and closed bottom of said container, and partition means integral with said side wall and extending across the hollow interior of said container while being spaced at a substantial distance from said open top and closed bottom thereof to define in the hollow interior of said container upper and lower chambers separated from each other by said partition means, said partition means having in the hollow interior of said container a free edge spaced from an inner side surface of said side wall and defining therewith an opening through which said chambers communicate with each other, and said partition means having a peripheral portion integral with side wall and extending around said central axis through an angle substantially greater than 180° but somewhat less than 360° so that said opening defined by said free edge of said partition means and said inner surface of said side wall has in a plane normal to said axis an area of substantially less than one half the area of the interior of said container which is surrounded by said side wall and situated in a plane normal to said axis, so that particles suspended in a liquid introduced into said container to an elevation substantially higher than said partition means will settle into said lower chamber to enable at least part of the liquid in said upper chamber to be poured out of the container in a condition substantially free of any suspended particles while, thereafter, the liquid in the lower chamber with the particles which have settled therein can also be poured out of the container, said partition means having an upper surface facing said open top of said container and a lower surface facing said closed bottom of said container, and said upper surface of said partition means being inclined with respect to said axis and having its lowest elevation situated at said free edge, said partition means including upper and lower walls both of which are integral with said side wall of said container, said upper and lower walls of said partition means intersecting at said free edge thereof and said upper and lower surfaces of said partition means respectively forming parts of said upper and lower walls thereof, said container having an exterior vertical wall extending between and formed integrally with said upper and lower walls of said partition means.

2. The device of claim 1 and wherein said upper surface of said partition means has its highest elevation at a part of said upper surface which is most distant from said free edge.

3. The device of claim 1 and wherein said lower surface of said partition means is substantially normal to said axis and substantially parallel to said closed bottom of said container.

4. The device of claim 1 and wherein said exterior vertical wall is situated in a plane which contains said axis.

5. The device of claim 4 and wherein said vertical wall is situated in a plane which substantially bisects said upper and lower walls of said partition means.

6. The device of claim 5 and wherein said vertical wall is of a substantially triangular configuration.

7. The device of claim 6 and wherein said vertical wall has an outer substantially vertical edge which forms substantially a continuation of an outer surface of said side wall.

8. The device of claim 1 and wherein said side wall of said container is formed with at least one exterior indentation to facilitate grasping of said container.

9. The device of claim 1 and wherein the device includes a closure member adapted to be situated removably on said container closing said open top thereof.

* * * * *